United States Patent
Krithivas et al.

(10) Patent No.: US 9,577,953 B2
(45) Date of Patent: Feb. 21, 2017

(54) DETERMINATION OF A SUITABLE TARGET FOR AN INITIATOR BY A CONTROL PLANE PROCESSOR

(71) Applicants: Ramamurthy Krithivas, Chandler, AZ (US); Jacek Reniecki, Hillsboro, OR (US); Daniel P. Daly, Ann Arbor, MI (US); Madhusudhan Rangarajan, Round Rock, TX (US)

(72) Inventors: Ramamurthy Krithivas, Chandler, AZ (US); Jacek Reniecki, Hillsboro, OR (US); Daniel P. Daly, Ann Arbor, MI (US); Madhusudhan Rangarajan, Round Rock, TX (US)

(73) Assignee: INTEL CORPORATION, Santa Clara, CA (US)

( * ) Notice: Subject to any disclaimer, the term of this patent is extended or adjusted under 35 U.S.C. 154(b) by 68 days.

(21) Appl. No.: 14/128,453

(22) PCT Filed: Sep. 27, 2013

(86) PCT No.: PCT/US2013/062466
§ 371 (c)(1),
(2) Date: Jul. 23, 2014

(87) PCT Pub. No.: WO2015/047347
PCT Pub. Date: Apr. 2, 2015

(65) Prior Publication Data
US 2015/0095515 A1  Apr. 2, 2015

(51) Int. Cl.
G06F 15/16 (2006.01)
H04L 12/931 (2013.01)
(Continued)

(52) U.S. Cl.
CPC ............... *H04L 49/00* (2013.01); *G06F 9/00* (2013.01); *H04L 41/00* (2013.01);
(Continued)

(58) Field of Classification Search
CPC ...... H04L 61/2076; H04L 49/00; H04L 67/28; H04L 41/00; H04L 61/2015; H04L 67/1097; G06F 9/00
See application file for complete search history.

(56) References Cited

U.S. PATENT DOCUMENTS

2003/0097607 A1  5/2003  Bessire
2005/0120222 A1  6/2005  Mitsuoka et al.
(Continued)

FOREIGN PATENT DOCUMENTS

JP  2007-036801  2/2007

OTHER PUBLICATIONS

Alexander, S. et al., "DHCP Options and BOOTP Vendor Extensions", RFC 2132, Mar. 1997, 34 pp.
(Continued)

*Primary Examiner* — Joseph Greene
(74) *Attorney, Agent, or Firm* — Konrad Raynes Davda & Victor LLP; Rabindranath Dutta

(57) ABSTRACT

A first computational device receives a response generated by a second computational device for a third computational device. A target that is suitable for use by the third computational device is determined. The response is transmitted with an address of the target to the third computational device.

20 Claims, 8 Drawing Sheets

(51) Int. Cl.
*H04L 29/08* (2006.01)
*H04L 29/12* (2006.01)
*G06F 9/00* (2006.01)
*H04L 12/24* (2006.01)

(52) U.S. Cl.
CPC .......... *H04L 61/2015* (2013.01); *H04L 67/28* (2013.01); *H04L 67/1097* (2013.01)

(56) References Cited

U.S. PATENT DOCUMENTS

| | | | | |
|---|---|---|---|---|
| 2007/0027963 | A1* | 2/2007 | Cors | H04L 61/2015 709/220 |
| 2009/0292792 | A1* | 11/2009 | Soulhi | G06Q 10/06 709/220 |
| 2013/0132607 | A1* | 5/2013 | Sinha | H04L 45/00 709/238 |
| 2013/0346795 | A1* | 12/2013 | Gladwin | G06F 12/1458 714/6.22 |

OTHER PUBLICATIONS

Droms, R., "Dynamic Host Configuration Protocol", RFC 2131, Mar. 1997, 40 pp.
INCITS, "T10 Working Drafts", [online], [Retrieved on Sep. 27, 2013], retrieved from the Internet at <URL: http://www.t10.org/drafts.htm>, 18 pp.
Satran, J., et al., "Internet Small Computer Systems Interface (iSCSI)", RFC 3720, Apr. 2004, 219 pp.
Machine Translation of JP Publication No. 2007-036801, dated Feb. 8, 2007, 24 pp.
International Search Report and Written Opinion for International Application No. PCT/US2013/062466, Apr. 30, 2014, 10 pp.
International Preliminary Report of Patentability for International Application No. PCT/US2013/062466, Apr. 7, 2016, 7 pp.

* cited by examiner

DETERMINATION OF A SUITABLE TARGET FOR AN INITIATOR BY A CONTROL PLANE PROCESSOR

BACKGROUND

In computing, iSCSI is an acronym for Internet Small Computer System Interface, an Internet Protocol (IP)-based storage networking standard for linking data storage facilities over a Storage Area Network (SAN). The iSCSI standard is defined and described by the IETF (Internet Engineering Task Force) standards body in Request for Comments (RFC) 3720, published April 2004. In iSCSI, Small Computer System Interface (SCSI) commands are carried over Internet Protocol (IP) networks, to facilitate data transfers and to manage storage over long distances [T10 is an American National Standards Institute (ANSI) body responsible for developing SCSI Standards that include SCSI Architecture Model (SAM), SCSI Primary Commands (SPC), SCSI Block Commands (SBC), Serial Attached SCSI (SAS), SES (SCSI Enclosure Standard), and SCC (SCSI Controller Commands), and further details of SCSI may be found in "http://www.t10.org/drafts.htm"]. Using the iSCSI protocol, data may be transmitted over networks, such as local area networks (LANs), wide area networks (WANs), or the Internet, to allow location-independent data storage and retrieval.

The iSCSI protocol allows clients (called initiators) to send SCSI commands to SCSI storage devices (called targets) on remote servers. Organizations are allowed to consolidate storage into data center storage arrays while providing hosts with the illusion of locally attached disks. iSCSI Initiators are the iSCSI devices that start an input/output (I/O process) and iSCSI targets are the iSCSI devices that respond to a request to perform an I/O process using SCSI standard commands.

In network data transmission operations in a computing environment, an initiator device transmits data or commands over the network to a target device. The initiator functions as an iSCSI client. An iSCSI initiator may be a software initiator or a hardware initiator. The hardware initiator may use hardware, typically in combination with software or firmware running on that hardware, to implement iSCSI.

A target device, such as, a server, storage controller or host computer, may include an iSCSI target controller or subsystem to access the SCSI commands stored in the payload of an iSCSI packet, and to perform the SCSI commands. The iSCSI target may comprise a dedicated network-connected hard disk storage device, a general-purpose computer, etc. In a data center or enterprise environment, an iSCSI target may reside in a large storage array. The storage array may provide distinct iSCSI targets for numerous clients.

Dynamic Host Configuration Protocol (DHCP) is a network protocol used to configure devices that are connected to a network so that the devices can communicate on the network using the Internet Protocol (IP). Further details of DHCP is defined and described by the IETF (Internet Engineering Task Force) standards body in RFC 2131 and 2132, both published March 1997. DHCP may be used in association with iSCSI for configuring devices

BRIEF DESCRIPTION OF THE DRAWINGS

Referring now to the drawings in which like reference numbers represent corresponding parts throughout.

DESCRIPTION OF THE EMBODIMENTS

In the following description, reference is made to the accompanying drawings which form a part hereof and which illustrate several embodiments. It is understood that other embodiments may be utilized and structural and operational changes may be made.

Servers in a computing environment that supports iSCSI may be designed in various form factors such as tower servers, rack servers, blade servers, microservers, etc. Microservers comprise a class of server platforms based on Server System on Chip (SoC) processors deployed in a data center environment. The distributed nature of the workloads imposes a high performance per watt, and a high scale-out requirement, on the computing and storage infrastructure. Delivering services to a large number of nodes within a restrictive form factor and within a given restrictive power profile is a core system requirement. Additionally, this scaled out environment should be easy to manage to reduce the overall total cost of ownership.

Microserver platforms are physically realized via micromodules that contain one or more independent SoC nodes. The micromodules are collectively deployed in a system container usually referred to as "Chassis". Each node is a separate coherent domain comprising independent Serial Peripheral Interface (SPI) Flash Basic Input/Output System (BIOS), Boot disk, Voltage Rails (VR), VR controller etc. It is important to reduce redundant components such as multiple boot disks that not only require power and physical real estate on the micromodule compared to other components but also impose a total cost of ownership burden to manage multiple operating system versions, etc.

There are a number of alternatives available for network boot and iSCSI is the primary choice given the wide operating system support base and enterprise class features, such as, security and fault tolerance.

In a computing environment comprising of thousands of nodes, data centers may be reluctant to deploy iSCSI as it may impose significant network and infrastructure management requirements to enable iSCSI initiator nodes to discover their respective iSCSI boot target nodes.

Certain embodiments provide a mechanism by which iSCSI initiator nodes are able to automatically discover iSCSI target nodes. Such embodiments do not impose any overhead to the data center management infrastructure. In addition, such embodiments are able to dynamically match iSCSI initiator nodes with iSCSI target boot nodes based on multiple policy considerations to deliver consistent boot times.

Figure 1:
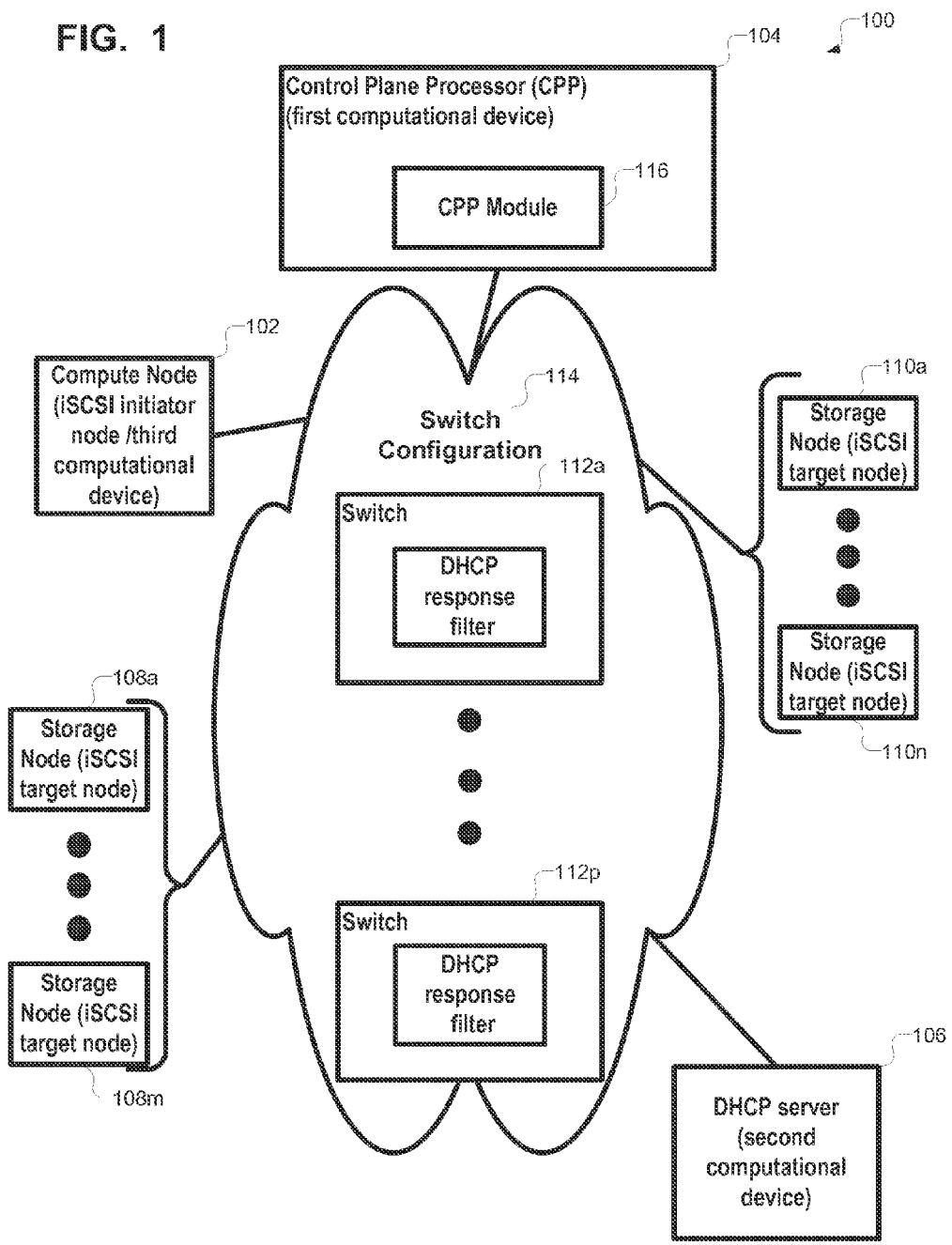
FIG. 1 illustrates a block diagram of a computing environment for the discovery of a target by an initiator via a control plane processor, in accordance with certain embodiments.

FIG. 1 illustrates a block diagram of a computing environment 100 for the discovery of a target by an initiator via a control plane processor, in accordance with certain embodiments. In certain embodiments, the components of the computing environment 100 may be implemented in a data center.

The computing environment 100 may include a compute node 102 that operates as an iSCSI initiator node, a control plane processor (CPP) 104, a DHCP server 106, a plurality or storage nodes 108a . . . 108m, 110a . . . 110n, where the compute node 102, the control plane processor 104, the DHCP server 106 and the plurality of storage nodes 108a . . . 108m, 110a . . . 110n are all nodes that are coupled via a plurality of switches 112a . . . 112p. The nodes within the computing environment 100 may comprise any suitable computing device, such as, a personal computer, a server computer, a mini computer, a mainframe computer, a blade computer, a tablet computer, a touch screen computing device, a telephony device, a cell phone, a mobile computational device, etc., that are implemented in certain embodiments in a plurality of form factors, such as, tower servers, rack servers, blade servers, microservers, etc.

In certain embodiments, the compute node 102, the control plane processor 104, the DHCP server 106, the plurality of storage nodes 108a . . . 108m, 110a . . . 110n, and the plurality of switches 112a . . . 112p are enclosed within racks and chassis within the data center within which the computing environment 100 is implemented. An exemplary rack comprises of a multiple number of chassis, where a chassis may have an Ethernet switch and multiple nodes. The nodes may comprise the compute node 102, the control plane processor 104, the DHCP server 106 and the plurality of storage nodes 108a . . . 108m, 110a . . . 110n that are coupled via a plurality of switches 112a . . . 112p, where the plurality of switches 112a . . . 112p are enclosed within a plurality of chassis. In certain embodiments, the plurality of switches 112a . . . 112p may be Ethernet switches.

The compute node 102 comprises an iSCSI initiator node. The control plane processor 104 configures the path or routing table of the ports of the plurality of switches 112a . . . 112p, and updates the routing tables based on messages from the switches 112a . . . 112p. The storage nodes 108a . . . 108m, 110a . . . 110n may comprise iSCSI targets that provide shared storage or boot support for the iSCSI initiator node 102, where the boot support may include booting a version or a type of an operating system. The DHCP server 106 that is also referred to as an infrastructure node may be responsible for assigning Internet Protocol (IP) addresses to all nodes.

The switch configuration 114 of the plurality of switches 112a . . . 112p is such that a plurality of chassis are interconnected with each other in a fault tolerant manner, and at least one of the switches provide an aggregate uplink port through which one or more of the nodes communicate with other computing environments that are different from the computing environment 100.

Certain embodiments are implemented via a control plane processor module 116 (CPP module) that executes within the control plane processor 104. The CPP module 116 programs all switches to forward DHCP responses from the DHCP server 106, generated on a request from a compute node 102, to itself (i.e., the CPP module 116). The CPP module 116 then injects a "DHCP Option 17" command to the intercepted DHCP response and sends the modified DHCP response back to the compute node 102. The injected "DHCP Option 17" command includes the path-name (e.g., the address) of an iSCSI target (e.g., an iSCSI target node selected from the storage nodes 108a . . . 108m, 110a . . . 110n). Further details of the "DHCP Option 17" command may be found in section 3.19 of RFC 2132 ("DHCP Options and BOOTP Vendor Extensions") published by IETF in March 2007. According to section 3.19 of RFC 2132, a Root Path option specifies the path-name that contains the client's root disk, where the path is formatted as a character string, and the code for the Root Path option is 17.

As a result, the CPP Module 116 is able to match an iSCSI initiator (i.e., the control node 102) with any iSCSI target (e.g., an iSCSI target node selected from the storage nodes 108a . . . 108m, 110a . . . 110n) based on policy considerations. The policy considerations may provide an iSCSI initiator node with an iSCSI target node that is both proximate to the iSCSI initiator node and has a low processing load, such that system performance within the computing environment 100 is improved in comparison to the situation where the iSCSI target node is relatively distant from the iSCSI initiator node or has a high processing load.

Certain embodiments shown in FIG. 1, implement an iSCSI deployment such that no additional infrastructure such as an Internet Storage Name Server (iSNS) server is needed to match an initiator node to a target node. More importantly, the initiator to target matches generated by the CPP Module 116 are always bound by the physical scope of the rack. Such containment may not be possible by any other mechanism. Furthermore, the switches 112a . . . 112p may prioritize iSCSI traffic higher and provide greater performance guarantees for "boot" traffic.

Figure 2:
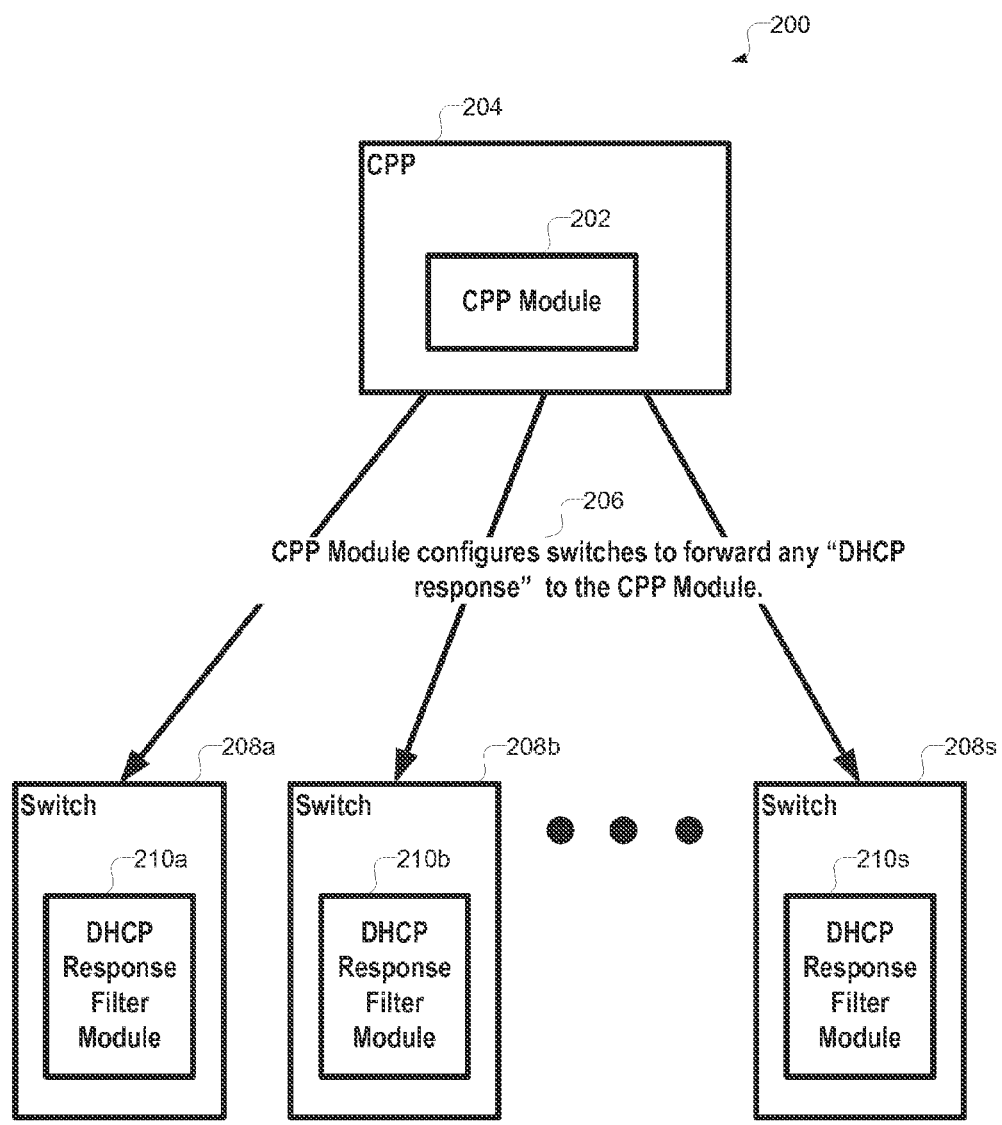
FIG. 2 illustrates a block diagram that shows how a control plane processor module configures switches to forward any Dynamic Host Control Protocol (DHCP) responses to the control plane processor module, in accordance with certain embodiments.

FIG. 2 illustrates a block diagram 200 that shows how a control plane processor module 202 included in a control plane processor 204 configures (reference numeral 206) a plurality of switches 208a, 208b, . . . , 208s to forward all Dynamic Host Control Protocol (DHCP) responses to the control plane processor module 202, in accordance with certain embodiments.

Each of the switches 208a, 208b, . . . , 208s include a DHCP response filter module (e.g., 210a, 210b, 210s). The DHCP response filter modules 210a, 210b, . . . , 210s avoid forwarding a DHCP response from a DHCP server to an iSCSI initiator node, and instead forwards the DHCP response either directly or indirectly to the CPP module 202.

Therefore, FIG. 2 illustrates certain embodiments in which a CPP module 202 configures switches 208a . . . 208s to forward DHCP responses to the CPP module 202 instead of forwarding the DHCP responses to the iSCSI initiator node.

Figure 3:
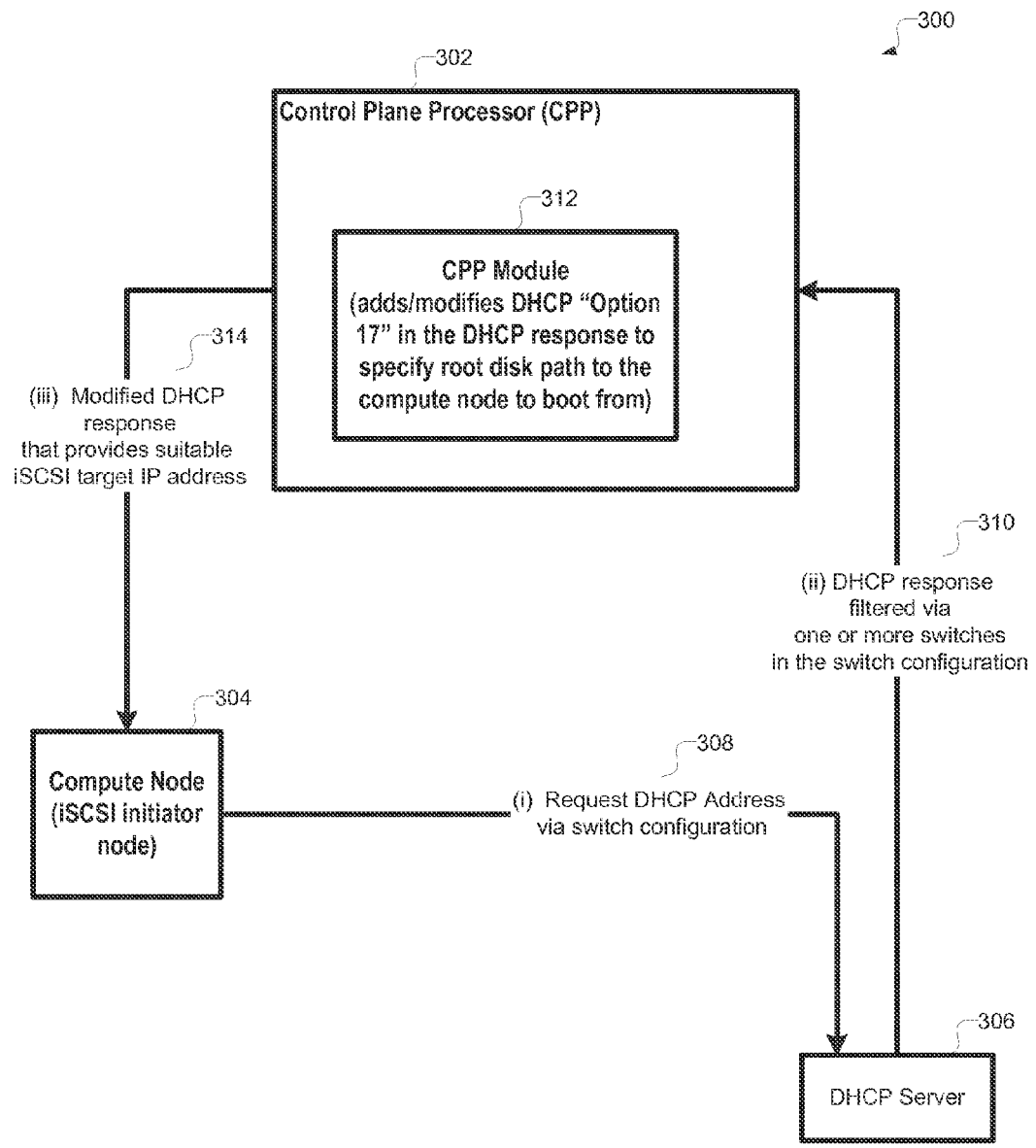
FIG. 3 illustrates a block diagram that shows how a control plane processor module generates a modified DHCP response that provides at least an IP address and the target name of an iSCSI target, to an iSCSI initiator, in accordance with certain embodiments.

FIG. 3 illustrates a block diagram 300 that shows how a control plane processor module 302 generates a modified DHCP response that provides at least an IP address and the target name of an iSCSI target, to an iSCSI initiator, in accordance with certain embodiments. In certain embodiments not only the IP address and the target name of the iSCSI target, but also the port and logical unit number (LUN) are provided in accordance with the iSCSI protocol. In certain embodiments, the port and LUN are optional, and if not provided the port and LUN may default to 3260 and 0 respectively. In certain embodiments, multiple target names may be associated with a single iSCSI target, where different versions or types of operating system may be associated with different target names. In certain embodiments in which iSCSI targets maintain more than one type or version of an operating system, a determination may be made as to which operating system image to use to boot on a particular node, by selecting the appropriate target name of the iSCSI target.

In certain embodiments, the compute node 304 that comprises an iSCSI initiator requests a DHCP server 306 for a DHCP address where the request is transmitted to the DHCP server 306 via a switch configuration (as shown via reference numeral 308). The control plane processor 302 is configured to provide the iSCSI boot configurations to the iSCSI initiator 304. The control plane processor 302 is configured to specify at least the root path in a "DHCP option 17" command in responding with the iSCSI target information back to the iSCSI initiator 304. In "DHCP Option 17", the iSCSI root path option configuration string uses the following format:

"ISCSI:<server name or IP address>:<protocol>:<port>:<LUN>:<targetname>", where:

a) Server name: DHCP server name or valid IPv4 address literal;
b) Protocol: Transportation protocol used by iSCSI;
c) Port: Port number of the iSCSI;
d) LUN: Logical Unit (LUN) identifier (ID) configured on iSCSI target node; and
e) Target name: iSCSI target name to uniquely identify an iSCSI target.

In response to receiving the request for the DHCP address, the DHCP server 306 returns the DHCP response to the switch configuration, and one or more switches in the switch configuration forward the returned DHCP response to the control plane processor 302 (as shown via reference numeral 310).

The CPP module 312 that executes within the control plane processor 302 receives the DHCP response and adds or modifies the "DHCP Option 17" command in the DHCP response to specify a root disk path to the compute node 304, where the root disk path corresponds to an IP address and a target name of an iSCSI target node from which the compute node 304 can boot from. The CPP module 312 sends the modified DHCP response with the suitable iSCSI target IP address and a target name to the compute node 304 (shown via reference numeral 314), and the compute node 304 may boot by using the iSCSI target determined via the iSCSI target IP address and the target name.

Therefore, FIG. 3 illustrates certain embodiments in which the control plane processor 302 sends a modified DHCP response to the compute node 304 to indicate the iSCSI target location IP address and target name that is to be used by the compute node 304 to boot.

Figure 4:
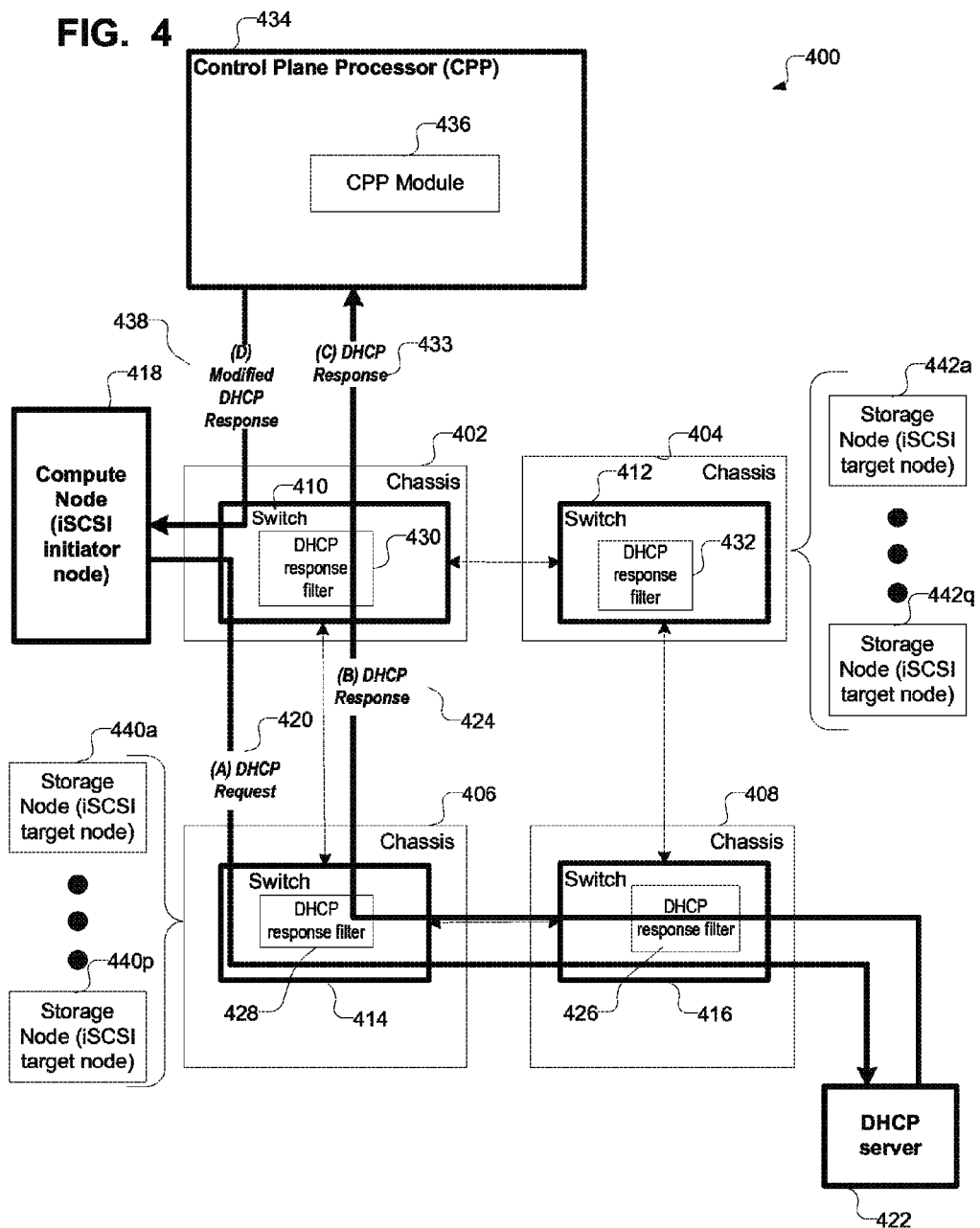
FIG. 4 illustrates a block diagram of a computing environment for the discovery of a target by an initiator via a control plane processor where a plurality of chassis enclose a plurality of switches, in accordance with certain embodiments.

FIG. 4 illustrates a block diagram of a computing environment 400 for the discovery of an iSCSI target by an iSCSI initiator via a control plane processor where a plurality of chassis enclose a plurality of switches, in accordance with certain embodiments.

FIG. 4 shows four exemplary chassis 402, 404, 406, 408, where each chassis has one or more switches. Exemplary switches 410, 412, 414, 416 are shown in FIG. 4. In an exemplary switch configuration, switch 410 and switch 412 are configured to be in direct communication, switch 412 and switch 416 are configured to be in direct communication and switch 414 and switch 416 are configured to be in direct communication.

A compute node 418 may send a DHCP request 420 for securing network operating parameters, such as IP address of the compute node, etc., to the DHCP server 422 via the switches 410, 414, 416. The DHCP server 422 may receive the DHCP request 420 and send a DHCP response 424 that is forwarded by the DHCP response filters 426, 428, 430 to redirect (reference numeral 433) the DHCP response 424 to the control plane processor 434. The CPP module 436 that executes in the control plane processor 434 sends a modified DHCP response (reference numeral 438) via a switch (e.g., switch 410) to the compute node 418, where the modified DHCP response 438 indicates that storage node 440a selected from the plurality of storage nodes 440a . . . 440p, 442a . . . 442q is to be used for booting by the compute node 418. In certain embodiments the storage node 440a may be proximate to the compute node 418 and lightly loaded, and is preferred over other storage nodes for booting to ensure better system performance. The CPP Module 436 may either discover the iSCSI targets 440a . . . 440p, 442a . . . 442q or each iSCSI target may register with the CPP module 436, such that based on information maintained by the CPP module 436 the CPP module 436 is able to determine which iSCSI target is most suitable for the compute node 418 to boot from.

Therefore, FIG. 4 illustrates certain embodiments in which the control plane processor 434 determines which iSCSI target is most suitable for an iSCSI initiator to boot from or to perform other operations. The control plane processor 434 sends a modified DHCP response to the iSCSI initiator 418 to provide at least the IP address and the target name of the iSCSI target.

Figure 5:
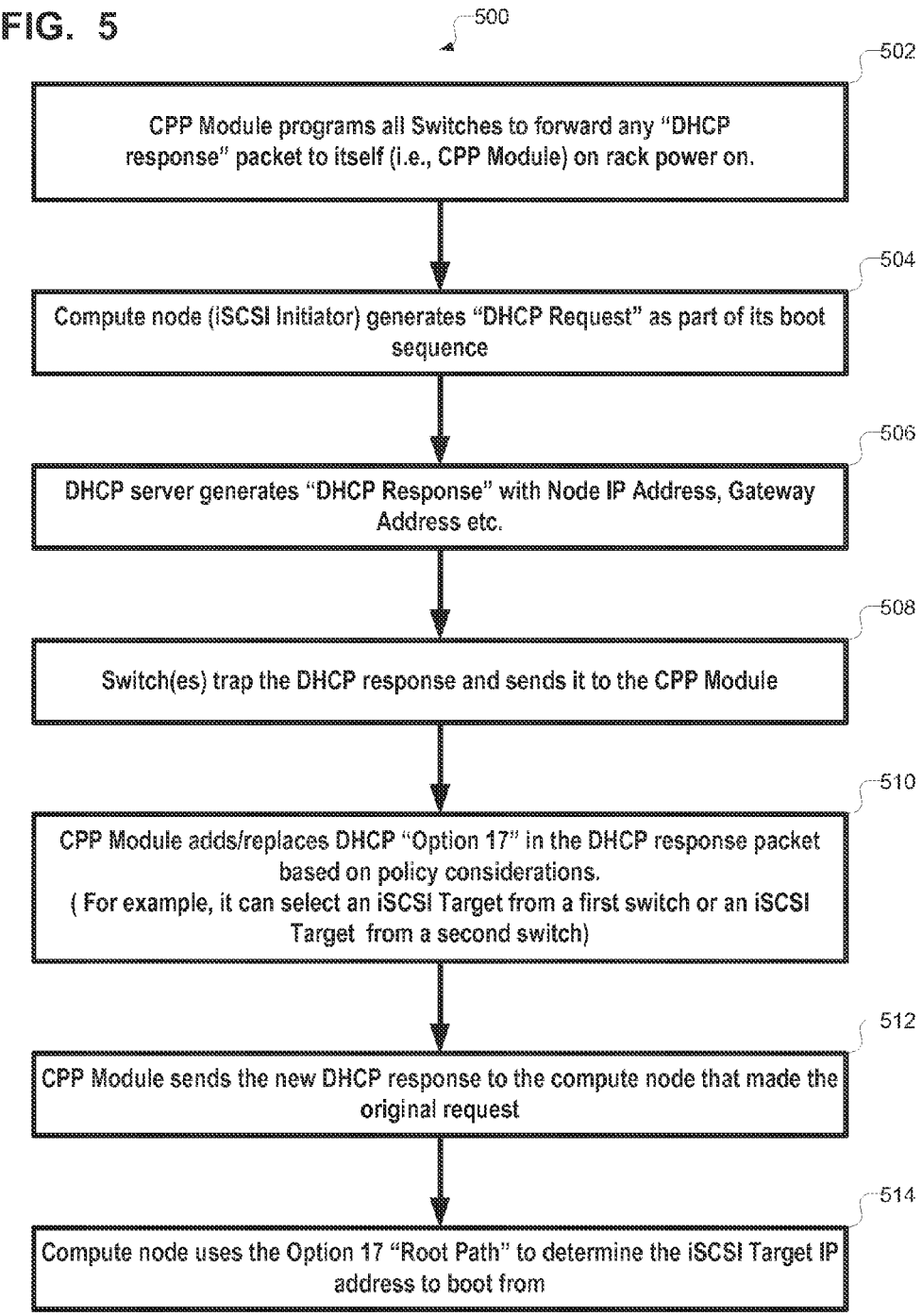
FIG. 5 illustrates first operations for the discovery of a target by an initiator, in accordance with certain embodiments.

FIG. 5 illustrates first operations 500 for the discovery of a target by an initiator, in accordance with certain embodiments. The operations shown in FIG. 5 may be performed by various nodes and switches in the computing environment 100, 200, 300, 400.

Control starts at block 502 in which a CPP module 116 programs all switches to forward any DHCP response packets to itself (i.e., CPP Module) on rack power on, where a rack may include a plurality of switches included within a plurality of chassis. A compute node (iSCSI initiator) 102 generates (at block 504) a "DHCP Request" for securing network parameters, such as the IP address of the computer node, as part of its boot sequence. On receipt of the DHCP request the DHCP server 106 generates (at block 506) a "DHCP Response" with Node IP Address, Gateway Address, etc., for sending to the iSCSI initiator 102.

Control proceeds to block 508 where one or more of the plurality of switches 112a . . . 112p trap the DHCP response and sends the DHCP response to the CPP Module 116. At block 510, The CPP module 116 adds or replaces "DHCP Option 17" in the DHCP response packet based on policy considerations. For example, CPP module 116 may select an iSCSI target coupled to switch 112a or an iSCSI target coupled to switch 112p.

Control proceeds to block 512, where the CPP module 116 sends the new DHCP response to the compute node 102 that made the original DHCP request. The compute node 102 uses (at block 514) the root path specified in the DHCP Option 17 command to determine the iSCSI Target IP address to boot from.

Therefore, FIG. 5 illustrates certain embodiments for the discovery of a target by an initiator, based on receiving a modified DHCP response from a control plane processor by an initiator, where the modified DHCP response may include the IP address and target name of the target.

Figure 6:
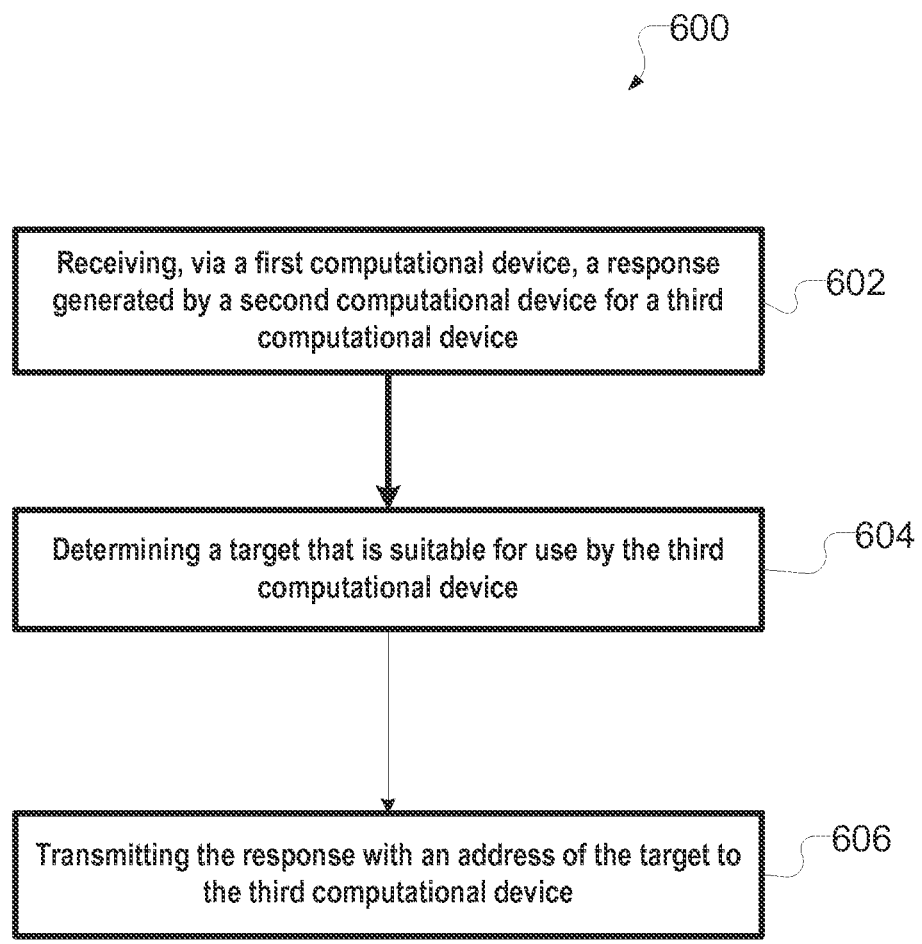
FIG. 6 illustrates second operations, in accordance with certain embodiments.

FIG. 6 illustrates second operations, in accordance with certain embodiments. The operations shown in FIG. 6 may be performed by various nodes and switches in the computing environment 100, 200, 300, 400.

Control starts at block 602 in which a first computational device (e.g., a control plane processor 104) receives a response generated by a second computational device (e.g. a DHCP server 106) for a third computational device (e.g., an iSCSI initiator node 102).

Control proceeds to block 604 in which a target (e.g., iSCSI target node 108a) that is suitable for use by the third computational device (e.g., the iSCSI initiator node 102) is determined. The response is then transmitted (at block 606) with an address of the target to the third computational device (e.g., the iSCSI initiator node 102).

In certain embodiments shown in FIG. 6, the suitability of the target for use by the third computational device is based on at least a distance of the target from the third computational device, an available bandwidth, and a processing load on the target. In additional embodiments, the target that is determined has a relatively light processing load and is relatively more proximate to the third computational device in comparison to other potential targets of a plurality of targets.

Figure 7:
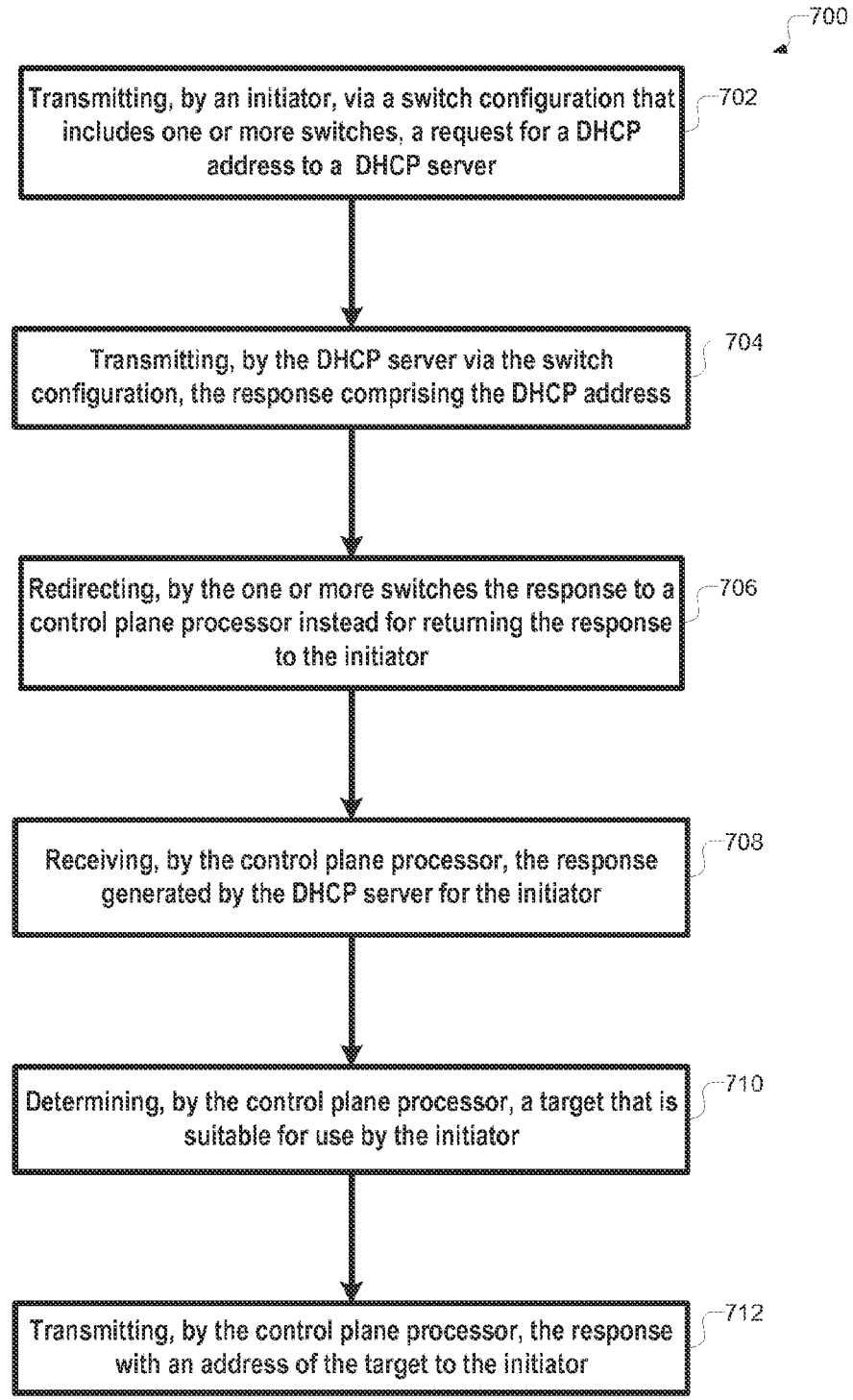
FIG. 7 illustrates third operations, in accordance with certain embodiments.

FIG. 7 illustrates third operations, in accordance with certain embodiments. The operations shown in FIG. 5 may be performed by various nodes and switches in the computing environment 100, 200, 300, 400.

Control starts at block 702 in which an initiator 102 transmits via a switch configuration 114 that includes one or more switches 112a . . . 112p, a request for a DHCP address to a DHCP server 106.

The DHCP server 106 transmits (at block 704) via the switch configuration 114, a response comprising the IP address. The one or more switches 112a . . . 112p redirect (at block 706) the response to a control plane processor 104 instead of returning the response to the initiator 102.

Control proceeds to block 708 in which the control plane processor 104 receives the response generated by the DHCP server 106 for the initiator 102. The control plane processor 104 determines (at block 710) a target (e.g., iSCSI target node 108a) that is suitable for use by the initiator 102. The control plane processor 104 transmits (at block 712) the response with an address of the target (e.g., iSCSI target node 108a) to the initiator 102.

Therefore FIGS. 1-7 illustrate certain embodiments in which an automated discovery of iSCSI targets for boot and other operations is performed by initiators where the iSCSI targets are discovered by a control plane processor, and the discovered iSCSI targets are relatively more proximate to the initiators and have a relatively lighter processing load in comparison to other iSCSI targets. In alternative embodiments instead of an iSCSI based protocol, other protocols may be used.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware.

A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 8:
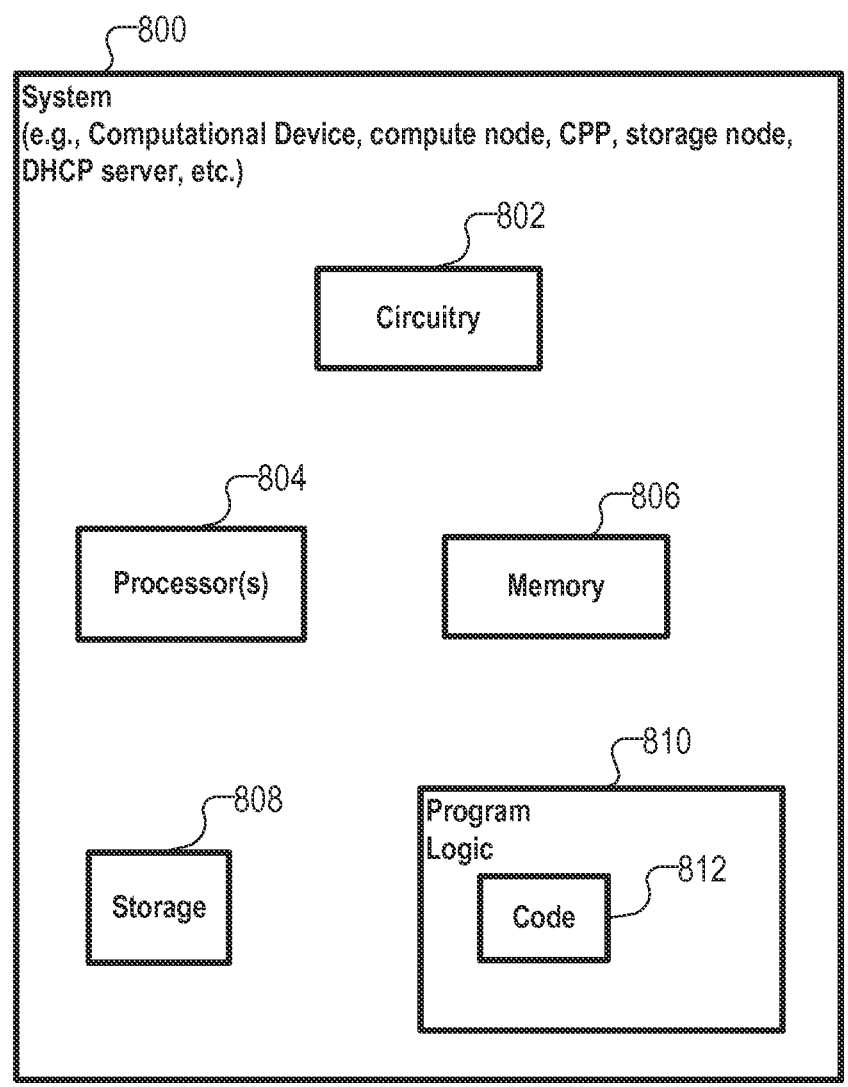
FIG. 8 illustrates a block diagram of a computer system that may implement certain components shown in FIG. 1, in accordance with certain embodiments.

FIG. 8 illustrates a block diagram that shows certain elements that may be included in the nodes (e.g., the compute node 102, the CPP 104, the storage nodes 108a . . . 108m, 110a . . . 110n, the DHCP server 106) of the computing environments 100, 200, 300, 400 in accordance with certain embodiments. The system 800 may correspond to any node in the computing environment 100, 200, 300, 400. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiments.

Example 1 is a method in which a first computational device receives a response generated by a second computational device for a third computational device. A determination is made of a target that is suitable for use by the third computational device. The response is transmitted with an address of the target to the third computational device.

In example 2, the subject matter of example 1 may include that suitability of the target for use by the third computational device is based on at least a distance of the target from the third computational device, an available bandwidth, and a processing load on the target.

In example 3, the subject matter of example 1 may include that the target that is determined has a relatively light processing load and is relatively more proximate to the third computational device in comparison to other potential targets of a plurality of targets.

In example 4, the subject matter of example 1 may include that the first computational device is a control plane processor, the second computational device is a Dynamic Host Configuration Protocol (DHCP) server, and the third computational device is an initiator.

In example 5, the subject matter of example 4 may include that the initiator transmits, via a switch configuration that includes one or more switches, a request for a DHCP address to the DHCP server, and that the DHCP server transmits via the switch configuration, the response comprising the DHCP address.

In example 6, the subject matter of example 5 may include redirecting, by the one or more switches the response to the control plane processor instead of returning the response to the initiator.

In example 7, the subject matter of example 6 may include that the address of the target is added to the response by modifying a DHCP Option 17 command.

Example 8 is a system, comprising a first computational device that is communicatively coupled to a second computational device and a third computational device, wherein the system comprises a memory, and a processor coupled to the memory, and wherein the processor is operable to receive a response generated by a second computational device for a third computational device, determine a target that is suitable for use by the third computational device, and transmit the response with an address of the target to the third computational device.

In example 9, the subject matter of example 8 may include that the suitability of the target for use by the third computational device is based on at least a distance of the target from the third computational device, an available bandwidth, and a processing load on the target.

In example 10, the subject matter of example 8 may include that the target that is determined has a relatively light processing load and is relatively more proximate to the third computational device in comparison to other potential targets of a plurality of targets.

In example 11, the subject matter of example 8 may include that the first computational device is a control plane processor, the second computational device is a Dynamic Host Configuration Protocol (DHCP) server, and the third computational device is an initiator.

In example 12, the subject matter of example 11 may include that the initiator is configurable to transmit via a switch configuration that includes one or more switches, a request for a DHCP address to the DHCP server, and the DHCP server is configurable to transmit via the switch configuration, the response comprising the DHCP address.

In example 13, the subject matter of example 12 may include that the one or more switches are configurable to redirect the response to the control plane processor instead of returning the response to the initiator.

In example 14, the subject matter of example 13 may include that the processor is further operable to add the address of the target to the response by modifying a DHCP Option 17 command.

Example 15 is a computer readable storage medium, wherein code stored in the computer readable storage medium when executed by a processor performs operations, the operations comprising receiving, via a first computational device, a response generated by a second computational device for a third computational device, determining a target that is suitable for use by the third computational device, and transmitting the response with an address of the target to the third computational device.

In example 16, the subject matter of example 15 may include that the suitability of the target for use by the third computational device is based on at least a distance of the target from the third computational device, an available bandwidth, and a processing load on the target.

In example 17, the subject matter of example 15 may include that the target that is determined has a relatively light processing load and is relatively more proximate to the third computational device in comparison to other potential targets of a plurality of targets.

In example 18, the subject matter of example 15 may include that the first computational device is a control plane processor, the second computational device is a Dynamic Host Configuration Protocol (DHCP) server, and the third computational device is an initiator.

In example 19, the subject matter of example 18 may include that the initiator transmits, via a switch configuration that includes one or more switches, a request for a DHCP address to the DHCP server, and the DHCP server transmits via the switch configuration, the response comprising the DHCP address.

In example 20, the subject matter of example 19 may include redirecting, by the one or more switches the response to the control plane processor instead of returning the response to the initiator.

In example 21, the subject matter of example 20 may include that the address of the target is added to the response by modifying a DHCP Option 17 command.

Example 22 is a system comprising a first computational device, a second computational device, and a third computational device, wherein the first, the second, and the third computational devices are communicatively coupled, and wherein the first computational device performs operations, wherein the system is operable to receive a response generated by the second computational device for the third computational device, determine a target that is suitable for use by the third computational device, and transmit the response with an address of the target to the third computational device.

In example 23, the subject matter of example 22 may include that the suitability of the target for use by the third computational device is based on at least a distance of the target from the third computational device, an available bandwidth, and a processing load on the target, wherein the target that is determined has a relatively light processing load and is relatively more proximate to the third computational device in comparison to other potential targets of a plurality of targets, and wherein the system is operable to add the address of the target to the response by modifying a DHCP Option 17 command.

Example 24 is a system, comprising means for receiving, via a first computational device, a response generated by a second computational device for a third computational device, means for determining a target that is suitable for use by the third computational device, and means for transmitting the response with an address of the target to the third computational device.

In example 25, the subject matter of example 24 may include that the suitability of the target for use by the third computational device is based on at least a distance of the target from the third computational device, an available bandwidth, and a processing load on the target, wherein the target that is determined has a relatively light processing load and is relatively more proximate to the third computational device in comparison to other potential targets of a plurality of targets. In example 25, the system may further comprise means for adding the address of the target to the response by modifying a DHCP Option 17 command.

Example 26 is a system comprising a first computational device, a second computational device, and a third computational device, wherein the first, the second, and the third computational devices are communicatively coupled, and wherein the first computational device is operable to receive a response generated by the second computational device for the third computational device, determine a target that is suitable for use by the third computational device, and transmit the response with an address of the target to the third computational device.

In example 27, the subject matter of example 26 may include that the suitability of the target for use by the third computational device is based on at least a distance of the target from the third computational device, an available bandwidth, and a processing load on the target, and wherein the target that is determined has a relatively light processing load and is relatively more proximate to the third computational device in comparison to other potential targets of a plurality of targets.

In example 28, the subject matter of example 26 may include that the first computational device is a control plane processor, the second computational device is a Dynamic Host Configuration Protocol (DHCP) server, and the third computational device is an initiator. In example 28, the system is further operable to transmit, by the initiator, via a switch configuration that includes one or more switches, a request for a DHCP address to the DHCP server, transmit, by the DHCP server via the switch configuration, the response comprising the DHCP address, and redirect, by the one or more switches the response to the control plane processor instead of returning the response to the initiator.

In example 29, the subject matter of example 28 may include that the system is operable to add the address of the target to the response by modifying a DHCP Option 17 command.

Example 30 is a computer readable storage medium, wherein code stored in the computer readable storage medium causes a processor to perform the method described in the subject matter of examples 1, 2, 3, 4, 5, 6, and 7.

Example 31 is a system comprising means for receiving, via a first computational device, a response generated by a second computational device for a third computational device, means for determining a target that is suitable for use by the third computational device, and means for transmitting the response with an address of the target to the third computational device.

In example 32, the subject matter of example 31 may include that the suitability of the target for use by the third computational device is based on at least a distance of the target from the third computational device, an available bandwidth, and a processing load on the target, and wherein the target that is determined has a relatively light processing load and is relatively more proximate to the third computational device in comparison to other potential targets of a plurality of targets.

In example 33, the subject matter of example 31 may include that the first computational device is a control plane processor, the second computational device is a Dynamic Host Configuration Protocol (DHCP) server, and the third computational device is an initiator. In example 33, the system further comprises means for transmitting, by the initiator, via a switch configuration that includes one or more switches, a request for a DHCP address to the DHCP server, means for transmitting, by the DHCP server via the switch configuration, the response comprising the DHCP address, and means for redirecting, by the one or more switches the response to the control plane processor instead of returning the response to the initiator.

In example 34, the subject matter of example 33 may include means for adding the address of the target to the response by modifying a DHCP Option 17 command.

Example 35 is a method for target determination in which a first computational device receives a response generated by a second computational device for a third computational device. A determination is made of a target that is suitable for use by the third computational device. The response is transmitted with an address of the target to the third computational device.

In example 36, the subject matter of example 35 may include that suitability of the target for use by the third computational device is based on at least a distance of the target from the third computational device, an available bandwidth, and a processing load on the target.

In example 37, the subject matter of example 35 may include that the target that is determined has a relatively light processing load and is relatively more proximate to the third computational device in comparison to other potential targets of a plurality of targets.

In example 38, the subject matter of example 35 may include that the first computational device is a control plane processor, the second computational device is a Dynamic Host Configuration Protocol (DHCP) server, and the third computational device is an initiator.

In example 39, the subject matter of example 38, may include that the initiator transmits, via a switch configuration that includes one or more switches, a request for a DHCP address to the DHCP server, and that the DHCP server transmits via the switch configuration, the response comprising the DHCP address.

In example 40, the subject matter of example 39 may include redirecting, by the one or more switches the response to the control plane processor instead of returning the response to the initiator.

In example 41, the subject matter of example 40 may include that the address of the target is added to the response by modifying a DHCP Option 17 command.

Example 42 is a system for target determination comprising a first computational device that is communicatively coupled to a second computational device and a third computational device, wherein the system comprises a memory, and a processor coupled to the memory, and wherein the processor is operable to receive a response generated by a second computational device for a third computational device, determine a target that is suitable for use by the third computational device, and transmit the response with an address of the target to the third computational device.

In example 43, the subject matter of example 42 may include that the suitability of the target for use by the third computational device is based on at least a distance of the target from the third computational device, an available bandwidth, and a processing load on the target.

In example 44, the subject matter of example 43 may include that the target that is determined has a relatively light processing load and is relatively more proximate to the third computational device in comparison to other potential targets of a plurality of targets.

In example 45, the subject matter of example 43 may include that the first computational device is a control plane processor, the second computational device is a Dynamic Host Configuration Protocol (DHCP) server, and the third computational device is an initiator. The initiator is configurable to transmit via a switch configuration that includes one or more switches, a request for a DHCP address to the DHCP server. The DHCP server is configurable to transmit via the switch configuration, the response comprising the DHCP address. The one or more switches are configurable redirect the response to the control plane processor instead of returning the response to the initiator.

In example 46, the subject matter of example 45 may include that the processor is further operable to add the address of the target to the response by modifying a DHCP Option 17 command.

Example 47 is a computer readable storage medium for target determination, wherein code stored in the computer readable storage medium when executed by a processor performs operations, the operations comprising receiving, via a first computational device, a response generated by a second computational device for a third computational device, determining a target that is suitable for use by the third computational device, and transmitting the response with an address of the target to the third computational device.

In example 48, the subject matter of example 47 may include that the suitability of the target for use by the third computational device is based on at least a distance of the target from the third computational device, an available bandwidth, and a processing load on the target.

In example 49, the subject matter of example 47 may include that the address of the target is added to the response by modifying a DHCP Option 17 command.

What is claimed is:

1. A method, comprising:
   programming, by a first computational device, one or more switches of a switch configuration to forward any Dynamic Host Configuration Protocol (DHCP) packet to the first computational device;
   transmitting, to a second computational device by a third computational device, via the switch configuration, a DHCP request for securing network parameters as part of a boot sequence of the third computational device;
   generating, by the second computational device, a DHCP response;
   trapping, by the one or more switches, the DHCP response generated by the second computational device, and forwarding the DHCP response to the first computational device instead of forwarding the DHCP response to the third computational device;
   receiving, by the first computational device, the DHCP response;
   determining, by the first computational device, a target that is suitable for use by the third computational device, and modifying the DHCP response;
   transmitting, by the first computational device, the modified DHCP response with an address of the target to the third computational device; and performing, booting of the third computational device by using the address of the target in the modified DHCP response.

2. The method of claim 1, wherein suitability of the target for use by the third computational device is based on at least a distance of the target from the third computational device, an available bandwidth, and a processing load on the target.

3. The method of claim 1, wherein the target that is determined has a relatively light processing load and is relatively more proximate to the third computational device in comparison to other potential targets of a plurality of targets.

4. The method of claim 1, wherein:
the first computational device is a control plane processor;
the second computational device is a DHCP server;
the third computational device is an initiator; and
the target is a storage node that provides boot support for the initiator.

5. The method of claim 1, wherein to generate the modified DHCP response the address of the target is added to the DHCP response by modifying a DHCP Option 17 command that includes an Internet Small Computer System Interface (iSCSI) target name to uniquely identify an iSCSI target.

6. A system, comprising a first computational device that is communicatively coupled to a second computational device and a third computational device, wherein the system comprises:
a memory; and
a processor coupled to the memory, wherein the processor is operable to:
program, by the first computational device, one or more switches of a switch configuration to forward any Dynamic Host Configuration Protocol (DHCP) packet to the first computational device;
transmit, to the second computational device by the third computational device, via the switch configuration, a DHCP request for securing network parameters as part of a boot sequence of the third computational device;
generate, by the second computational device, a DHCP response;
trap, by the one or more switches, the DHCP response generated by the second computational device, and forward the DHCP response to the first computational device instead of forwarding the DHCP response to the third computational device;
receive, by the first computational device, the DHCP response;
determine, by the first computational device, a target that is suitable for use by the third computational device, and modify the DHCP response;
transmit, by the first computational device, the modified DHCP response with an address of the target to the third computational device; and
perform, booting of the third computational device by using the address of the target in the modified DHCP response.

7. The system of claim 6, wherein suitability of the target for use by the third computational device is based on at least a distance of the target from the third computational device, an available bandwidth, and a processing load on the target.

8. The system of claim 6, wherein the target that is determined has a relatively light processing load and is relatively more proximate to the third computational device in comparison to other potential targets of a plurality of targets.

9. The system of claim 6, wherein:
the first computational device is a control plane processor;
the second computational device is a DHCP server;
the third computational device is an initiator; and
the target is a storage node that provides boot support for the initiator.

10. The system of claim 6, wherein to generate the modified DHCP response the processor is further operable to add the address of the target to the DHCP response by modifying a DHCP Option 17 command that includes an Internet Small Computer System Interface (iSCSI) target name to uniquely identify an iSCSI target.

11. A system, comprising:
a first computational device;
a second computational device; and
a third computational device, wherein the first, the second, and the third computational devices are communicatively coupled, and wherein the first computational device is operable to:
program one or more switches of a switch configuration to forward any Dynamic Host Configuration Protocol (DHCP) packet to the first computational device;
receive a DHCP response from the one or more switches, wherein the third computational device transmits to the second computational device, via the switch configuration, a DHCP request for securing network parameters as part of a boot sequence of the third computational device, wherein the second computational device generates the DHCP response, and wherein the one or more switches trap the DHCP response generated by the second computational device, and forward the DHCP response to the first computational device instead of forwarding the DHCP response to the third computational device;
determine a target that is suitable for use by the third computational device, and modify the DHCP response; and
transmit the modified DHCP response with an address of the target to the third computational device, wherein booting of the third computational device is performed by using the address of the target in the modified DHCP response.

12. A system, comprising:
a first computational device, a second computational device, and a third computational device;
means for programming, by a first computational device, one or more switches of a switch configuration to forward any Dynamic Host Configuration Protocol (DHCP) packet to the first computational device;
means for transmitting, to a second computational device by a third computational device, via the switch configuration, a DHCP request for securing network parameters as part of a boot sequence of the third computational device;
means for generating, by the second computational device a DHCP response;
means for trapping, by the one or more switches, the DHCP response generated by the second computational device, and forwarding the DHCP response to the first computational device instead of forwarding the DHCP response to the third computational device;
means for receiving, by the first computational device, the DHCP response;
means for determining, by the first computational device, a target that is suitable for use by the third computational device, and modifying the DHCP response;

means for transmitting, by the first computational device, the modified DHCP response with an address of the target to the third computational device; and means for performing, booting of the third computational device by using the address of the target in the modified DHCP response.

13. The system of claim 11, wherein suitability of the target for use by the third computational device is based on at least a distance of the target from the third computational device, an available bandwidth, and a processing load on the target.

14. The system of claim 11 wherein the target that is determined has a relatively light processing load and is relatively more proximate to the third computational device in comparison to other potential targets of a plurality of targets.

15. The system of claim 11, wherein:
the first computational device is a control plane processor;
the second computational device is a DHCP server;
the third computational device is an initiator; and
the target is a storage node that provides boot support for the initiator.

16. The system of claim 11, wherein to generate the modified DHCP response the address of the target is added to the DHCP response by modifying a DHCP Option 17 command that includes an Internet Small Computer System Interface (iSCSI) target name to uniquely identify an iSCSI target.

17. The system of claim 12, wherein suitability of the target for use by the third computational device is based on at least a distance of the target from the third computational device, an available bandwidth, and a processing load on the target.

18. The system of claim 12, wherein the target that is determined has a relatively light processing load and is relatively more proximate to the third computational device in comparison to other potential targets of a plurality of targets.

19. The system of claim 12, wherein:
the first computational device is a control plane processor;
the second computational device is a DHCP server;
the third computational device is an initiator; and
the target is a storage node that provides boot support for the initiator.

20. The system of claim 12, wherein to generate the modified DHCP response the address of the target is added to the DHCP response by modifying a DHCP Option 17 command that includes an Internet Small Computer System Interface (iSCSI) target name to uniquely identify an iSCSI target.

* * * * *